United States Patent
Frey

(10) Patent No.: US 11,898,602 B2
(45) Date of Patent: Feb. 13, 2024

(54) MULTI-ZONE AIR TURN FOR TRANSPORT OF A FLEXIBLE SUBSTRATE

(71) Applicant: Applied Materials, Inc., Santa Clara, CA (US)

(72) Inventor: Bernard Frey, Livermore, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 696 days.

(21) Appl. No.: 17/045,831

(22) PCT Filed: Apr. 10, 2019

(86) PCT No.: PCT/US2019/026791
§ 371 (c)(1),
(2) Date: Oct. 7, 2020

(87) PCT Pub. No.: WO2019/209534
PCT Pub. Date: Oct. 31, 2019

(65) Prior Publication Data
US 2021/0140472 A1    May 13, 2021

Related U.S. Application Data

(60) Provisional application No. 62/662,049, filed on Apr. 24, 2018.

(51) Int. Cl.
*B65H 20/14* (2006.01)
*F16C 32/06* (2006.01)
*B65H 27/00* (2006.01)

(52) U.S. Cl.
CPC ......... *F16C 32/0622* (2013.01); *B65H 27/00* (2013.01); *B65H 2401/242* (2013.01); *B65H 2406/1115* (2013.01); *B65H 2406/1131* (2013.01)

(58) Field of Classification Search
CPC .............. B65H 27/00; B65H 2401/242; B65H 2406/1115; B65H 2406/1131; B65H 20/14; F16C 13/00
See application file for complete search history.

(56) References Cited

U.S. PATENT DOCUMENTS

| | | | |
|---|---|---|---|
| 4,187,867 | A | 2/1980 | Sherman |
| 5,078,204 | A | 1/1992 | Loffredo et al. |
| 5,135,614 | A | 8/1992 | Aula et al. |

(Continued)

OTHER PUBLICATIONS

International Search Report and Written Opinion, PCT/US2019/026791, dated Jul. 26, 2019.

*Primary Examiner* — Sang K Kim
(74) *Attorney, Agent, or Firm* — Patterson + Sheridan, LLP

(57) ABSTRACT

Methods and apparatus for transporting a flexible substrate are provided. In one embodiment, an air turn is disclosed that includes a body, a porous cover disposed about a circumference of the body, and two seals. Each of the two seals are positioned about the circumference of the body and spaced apart from each other in a longitudinal direction of the body to define a central zone bounded by a second zone and by a third zone. The second zone and third zone are each positioned outside of a respective seal. The body includes a first opening formed along a longitudinal axis of the body, and a plurality of second openings formed in the body at a position other than along the longitudinal axis.

20 Claims, 4 Drawing Sheets

(56) References Cited

U.S. PATENT DOCUMENTS

| | | | | |
|---|---|---|---|---|
| 5,575,084 | A | 11/1996 | Vuorinen | |
| 6,125,754 | A * | 10/2000 | Harris | B65H 23/34 226/7 |
| 6,641,513 | B1 * | 11/2003 | Ward | B65H 27/00 492/59 |
| 7,758,727 | B2 | 7/2010 | Beuther et al. | |
| 2002/0181978 | A1 * | 12/2002 | Toyoda | F16C 13/00 399/325 |
| 2016/0068360 | A1 * | 3/2016 | Devitt | B65H 23/32 226/190 |
| 2017/0327334 | A1 * | 11/2017 | Finnemore | B65H 18/20 |
| 2018/0053946 | A1 * | 2/2018 | Ogasawara | H01M 4/881 |
| 2018/0111170 | A1 * | 4/2018 | Takei | C23G 3/00 |

\* cited by examiner

MULTI-ZONE AIR TURN FOR TRANSPORT OF A FLEXIBLE SUBSTRATE

BACKGROUND

Field

Embodiments of the present disclosure relate generally to an air bearing commonly known as an air turn, and more specifically, to methods, systems and apparatus for transport of a flexible substrate, such as flexible substrates utilized in fabricating printed electronic devices and energy storage devices.

Description of the Related Art

Flexible substrates are utilized in many applications in the manufacture of electronic devices. One such application is the deposition of materials onto a flexible substrate in the manufacture of high-capacity energy storage devices, such as lithium-ion (Li-ion) batteries.

Li-ion batteries typically include an anode electrode, a cathode electrode and a separator positioned between the anode electrode and the cathode electrode. The separator is an electronic insulator which provides physical and electrical separation between the cathode and the anode electrodes. The separator is typically made from micro-porous polyethylene and polyolefin, and is applied in a separate manufacturing step.

One method for manufacturing anode electrodes and cathode electrodes for energy storage devices is principally based on depositing thin films of cathodically active or anodically active material onto a flexible substrate serving as a conductive current collector. Conventionally, the flexible substrate is referred to as a web that is wound through a series of rotatable rollers in a deposition apparatus. Deposition onto the web is performed on or between the rollers. Drying of the deposited material may be performed on or between the rollers after the deposition.

However, conventional deposition apparatus have issues with controlling the flatness and/or deflection of the web during deposition. For example, deflection in an axial direction and/or a cross-web direction causes non-uniform deposition resulting in non-uniform thicknesses in the deposited material.

Accordingly, there is a need in the art for methods, systems and apparatus for replacing the conventional rotatable rollers.

SUMMARY

Methods and apparatus for transporting a flexible substrate are provided. In one embodiment, an air turn is disclosed that includes a body, a porous cover disposed about a circumference of the body, and two seals. Each of the two seals are positioned about the circumference of the body and spaced apart from each other in a longitudinal direction of the body to define a central zone bounded by a second zone and a third zone positioned outside of the each seal. The body includes a first opening formed along a longitudinal axis of the body, and a plurality of second openings formed in the body at a position other than along the longitudinal axis.

In another embodiment, an air turn is provided that includes a body, a porous cover disposed about a circumference of the body, and two seals. Each of the two seals are positioned about the circumference of the body and spaced apart from each other in a longitudinal direction of the body to define a central zone bounded by a second zone and by a third zone. The second zone and third zone are each positioned outside of a respective seal. The body includes a first opening formed along a longitudinal axis of the body, and a plurality of second openings formed in the body at a position other than along the longitudinal axis.

In another embodiment, a deposition module is provided that includes a dispenser assembly positioned to direct an electroactive material onto a flexible substrate that is transported by a plurality of air turns. A portion of each of the air turns comprises a body having a rod extending from an end of the body along a longitudinal axis thereof, a porous cover disposed about a circumference of the body, and two seals. Each of the two seals are positioned about the circumference of the body and spaced apart from each other in a longitudinal direction of the body to define a central zone bounded by a plurality of outer zones positioned outside of the each seal. The body includes a first opening formed along the longitudinal axis of the body, and a plurality of second openings formed in the body at a position other than along the longitudinal axis.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
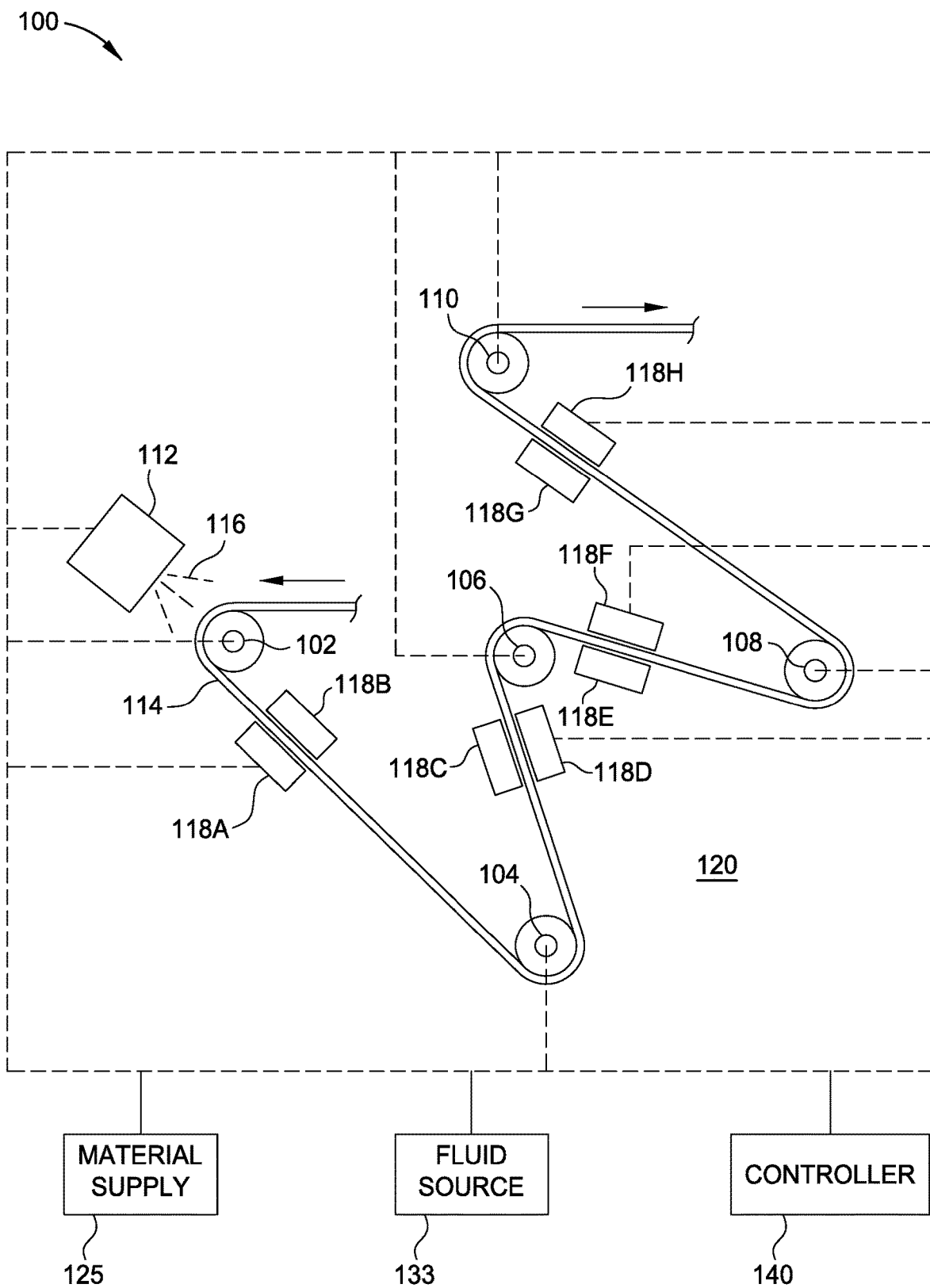
FIG. 1 is a schematic partial cross-sectional view of one embodiment of a deposition module according to embodiments described herein.

Embodiments of the present disclosure relate generally to an air bearing commonly known as an air turn, and more specifically, to methods, systems and apparatus for transport of a flexible substrate, such as flexible substrates utilized in fabricating energy storage devices. The disclosure includes a multi-zone air turn for transporting flexible substrates, sometimes referred to as a "web" of material, therearound. Certain embodiments described herein include the multi-zone air turn utilized with an apparatus for manufacturing of battery cell electrodes although the multi-zone air turn as described herein may be used with other systems that transport a flexible substrate and/or a web of material to deposit one or more layers of material thereon.

Battery cell electrodes are formed by depositing electroactive materials using deposition techniques, such as a spray process or printing process to form anodically active or cathodically active layers on substrates which function as current collectors, for example, copper substrates for anodes and aluminum substrates for cathodes. For bi-layer battery cells and battery cell components, opposing sides of the processed substrate may be simultaneously processed to form a bi-layer structure.

As deposited, the electro-active materials may comprise nanoscale sized particles and/or micro-scale sized particles. The electro-active materials may be deposited over three-dimensional conductive porous structures. The three-dimensional conductive porous structure may be formed by at least one of: a porous electroplating process, an embossing process, or a nano-imprinting process. In certain embodiments, the three-dimensional conductive porous structure comprises a wire mesh structure. The formation of the three-dimensional conductive porous structure determines the thickness of the electrode and provides pockets or wells into which the electro-active powders may be deposited using the systems and apparatus described herein. As used herein, "deposition techniques" include, but are not limited to, hydraulic spray techniques, atomizing spray techniques, electrospray techniques, plasma spray techniques, pneumatic spray techniques, and thermal or flame spray techniques as well as printing techniques.

The use of various types of substrates on which the materials described herein are formed is also contemplated. While the particular substrate on which certain embodiments described herein may be practiced is not limited, it is particularly beneficial to practice the embodiments on flexible conductive substrates, including for example, web-based substrates, or flexible ribbons. The substrate may also be in the form of a foil or a film. In certain embodiments where the substrate is a vertically oriented substrate, the vertically oriented substrate may be angled relative to a vertical plane. For example, the substrate may be slanted from between about 1 degree to about 45 degrees from the vertical plane. In certain embodiments where the substrate is a horizontally oriented substrate, the horizontally oriented substrate may be angled relative to a horizontal plane. For example, the substrate may be slanted from between about 1 degree to about 45 degrees from the horizontal plane. In certain embodiments, it may be beneficial to practice the embodiments on non-conductive flexible substrates. Exemplary non-conductive substrates include polymeric substrates.

FIG. 1 is a schematic partial cross-sectional view of one embodiment of a deposition module 100 having a series of air turns 102, 104, 106, 108 and 110 according to embodiments described herein. The deposition module 100 also includes a dispenser assembly 112. The deposition module 100 is configured to deposit an electro-active material over a flexible substrate 114. The dispenser assembly 112 directs electro-active material 116 toward the flexible substrate 114. The air turns 102, 104, 106, 108 and 110 support and transfer the flexible substrate 114 throughout the deposition module 100. The deposition module 100 also includes a plurality of optional heating elements 118 (shown as 118A, 118B, 118C, 118D, 118E, 118F, 118G and 118H) for drying the electro-active material 116 onto the flexible substrate 114.

The chamber body has a chamber inlet (not shown) for entry of the flexible substrate 114 into a processing region 120 of the deposition module 100 and a chamber outlet (not shown) for egress of the flexible substrate 114 from the processing region 120.

The dispenser assembly 112 may be positioned adjacent to any of the air turns 102, 104, 106, 108 and 110. As depicted in FIG. 1, the dispenser assembly 112 is positioned above a first air turn 102 for depositing electro-active material on a first side of the flexible substrate 114. Although not shown, it should be understood that additional dispenser assemblies may be positioned to deposit electro-active materials on the opposing side of the flexible substrate 114. The dispenser assembly 112 may be positioned to deposit electro-active material 116 on the flexible substrate 114 as the flexible substrate 114 is transferred over the first air turn 102.

Figure 2A:
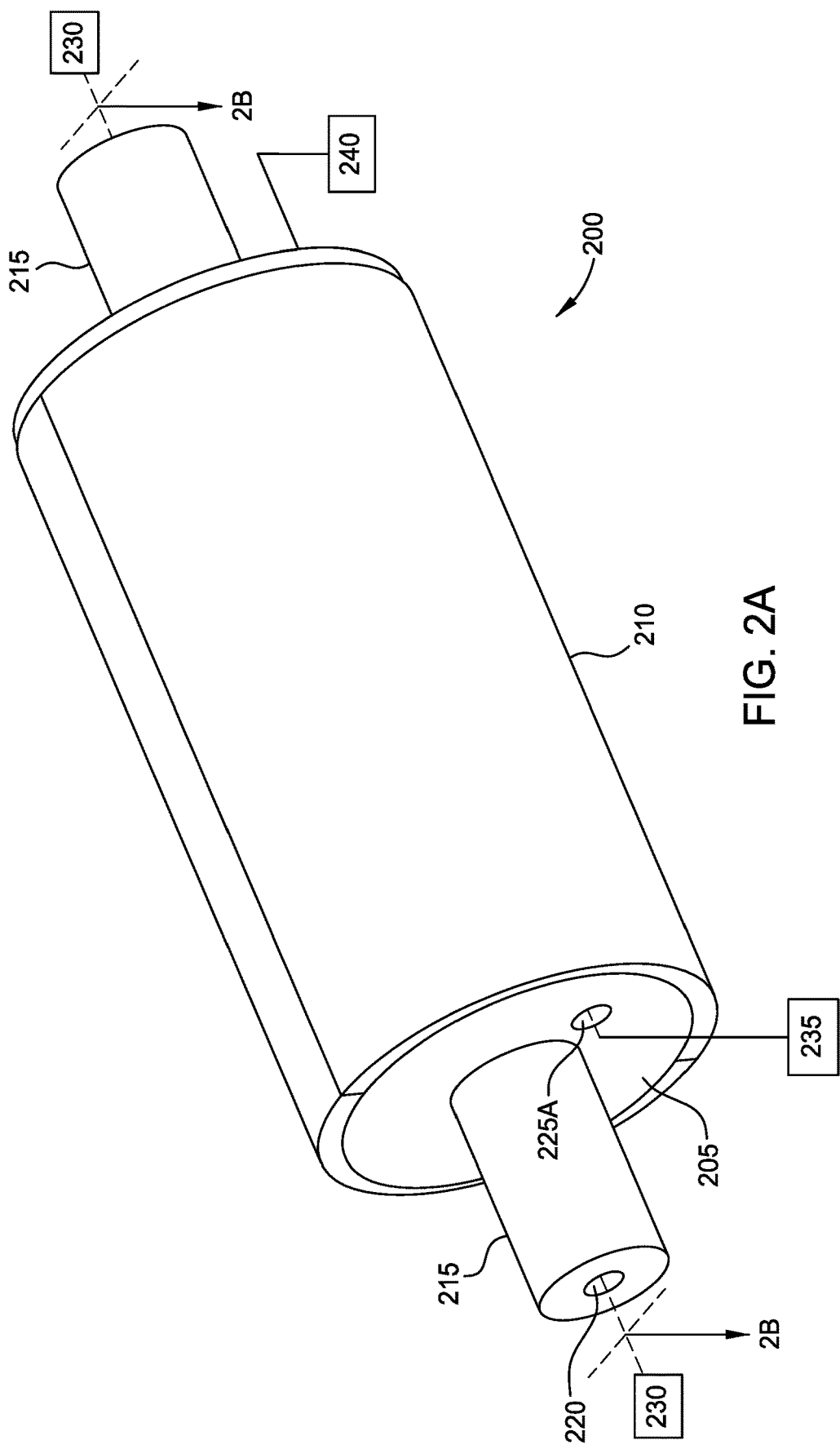
FIG. 2A is an isometric view of a multi-zone air turn according to embodiments described herein.
Figure 2B:
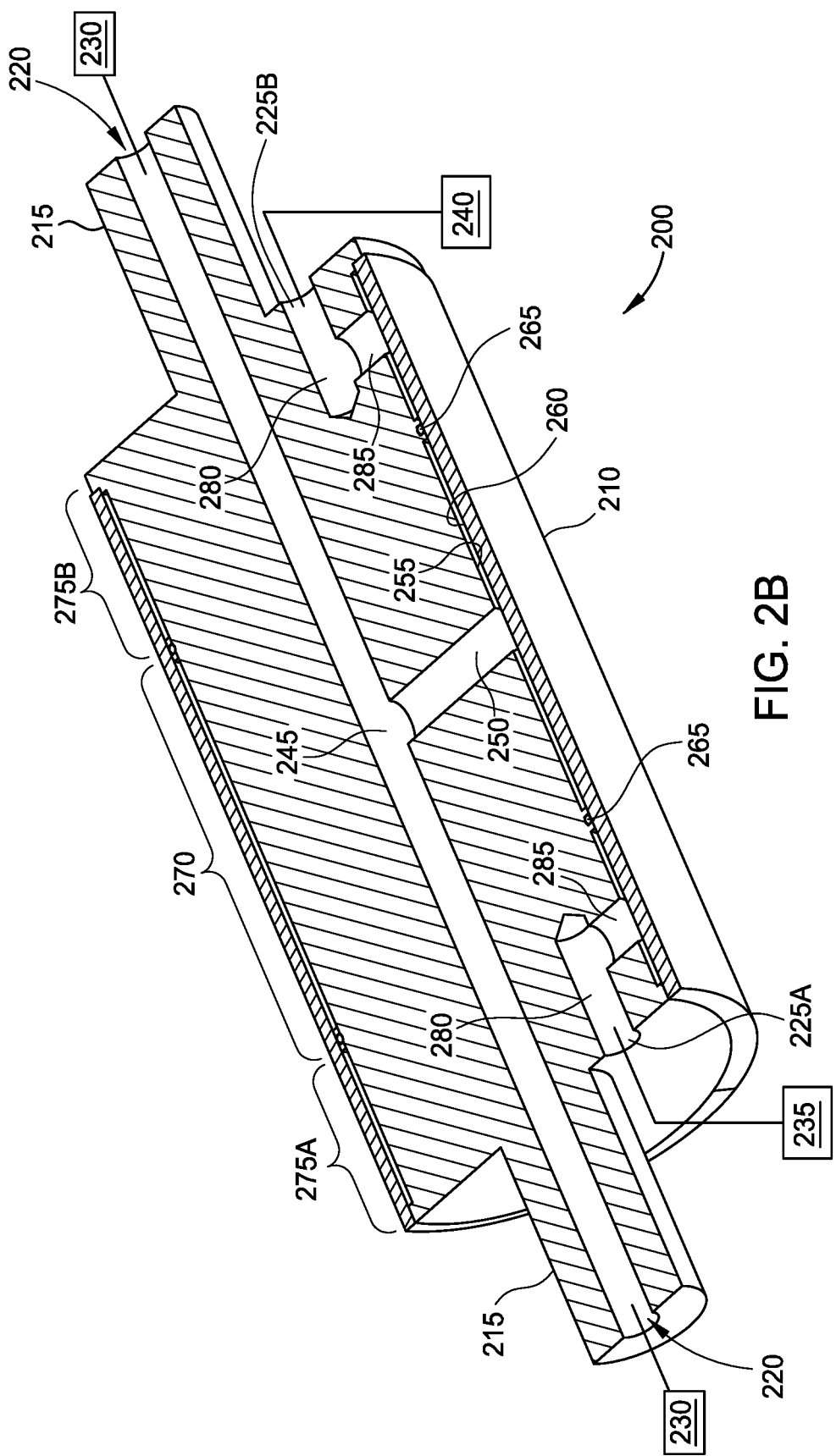
FIG. 2B is an isometric sectional view of the multi-zone air turn along lines 2B-2B of FIG. 2A.
Figure 2C:
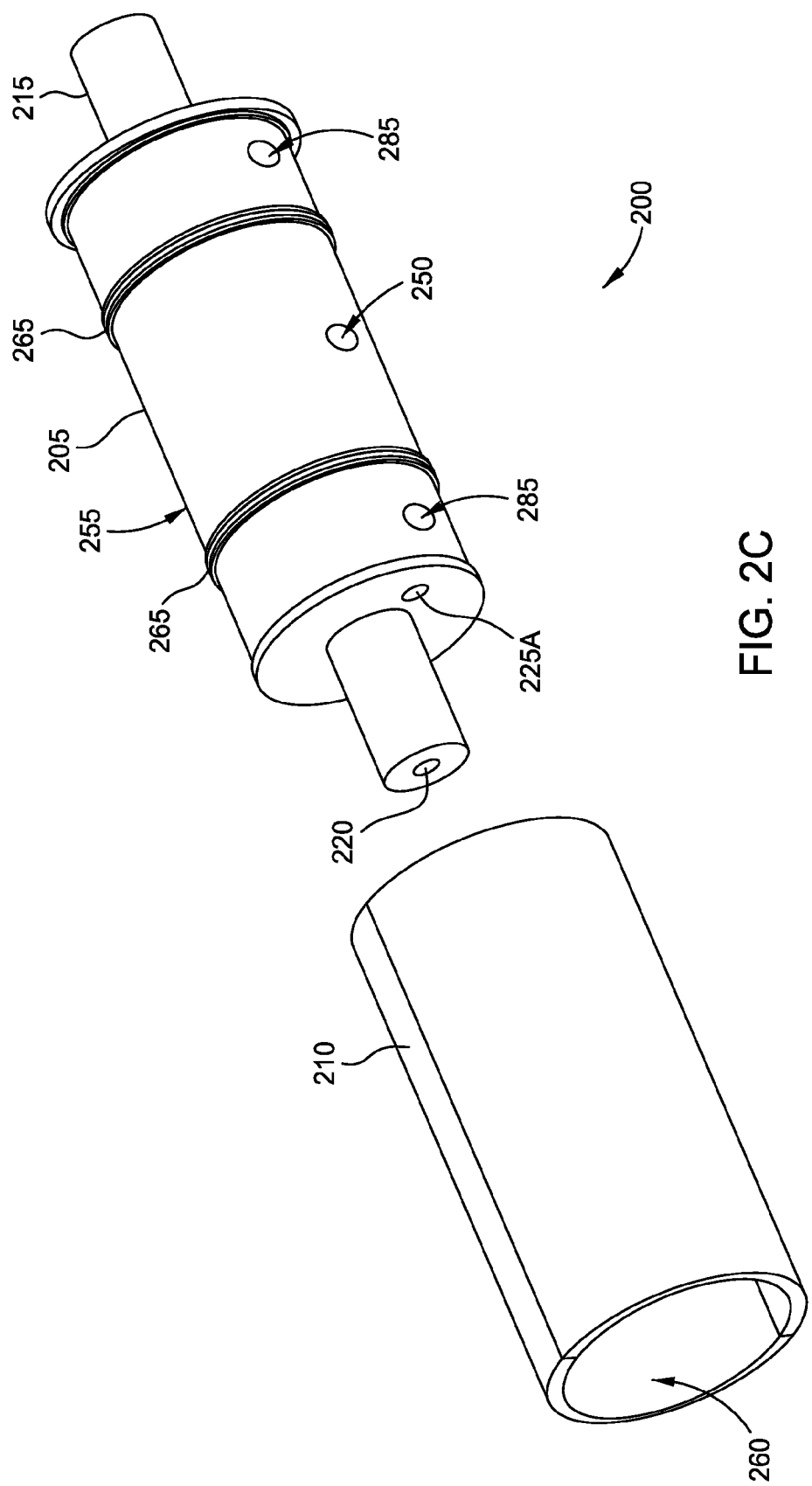
FIG. 2C is an isometric exploded view of the multi-zone air turn of FIG. 2A.

FIGS. 2A-2C are various views of one embodiment of a multi-zone air turn 200. The multi-zone air turn 200 is utilized as one or more of the air turns 102, 104, 106, 108 and 110 shown in FIG. 1. FIG. 2A is an isometric view of the multi-zone air turn 200 assembled. FIG. 2B is an isometric sectional view of the multi-zone air turn 200 along lines 2B-2B of FIG. 2A. FIG. 2C is an isometric exploded view of the multi-zone air turn 200 of FIG. 2A.

The multi-zone air turn 200 includes a body 205 that is at least partially surrounded by a cover 210. The body 205 is fabricated from a metallic material or a plastic material that resists structural deformation. In one example, the body 205 is made from aluminum. The cover 210 is fabricated from a porous material that in one example is a porous carbon material, such as graphite.

One or more rods 215 extend from the body 205. Each of the rods 215 are configured to be secured by the chamber body of the deposition module 100 shown in FIG. 1. A plurality of transverse (e.g., cross-machine direction) openings, shown as a first opening 220 and a second opening 225A, are formed in the body 205. In the view of FIG. 1, only one first opening 220 and one second opening 225A is shown. Each of the transverse openings 220 and 225A are configured to supply a fluid, such as a pressurized gas, to various zones of the multi-zone air turn 200. At least a portion of the transverse openings 220 and 225A are coupled to a dedicated fluid supply, shown as a first fluid supply 230, a second fluid supply 235, and a third fluid supply 240. Each of the fluid supplies 230, 235 and 240 includes a source of pressurized gases, such as clean dry air, or inert gases such as argon or helium. Each of the fluid supplies 230, 235 and 240 are operated independently of each other.

In FIG. 2B, the body 205 and the cover 210 are shown in cross-section. A pair of first openings 220 is shown at ends of the rods 215. The first openings 220 are coupled to a transverse channel 245 positioned along a longitudinal axis of the body 205. The transverse channel 245 is coupled to a central radial channel 250 that extends from the transverse channel 245 to an outer surface 255 of the body 205. Thus, pressurized fluids from the first fluid supply 230 flows through the transverse channel 245 and the central radial channel 250 to an inner surface 260 of the cover 210. Seals 265, such as O-rings, are provided between the outer surface 255 of the body 205 and the inner surface 260 of the cover 210. The portion of the multi-zone air turn 200 inside the seals 265 define an inner or first zone 270 of the multi-zone air turn 200. The portion of the multi-zone air turn 200 outside of the seals 265 define two outer zones, such as a second zone 275A and a third zone 275B. Pressurized fluid from the first fluid supply 230 is effectively sealed within the first zone 270 of the multi-zone air turn 200, at least in the longitudinal direction.

Also shown is a plurality of second openings 225A and 225B positioned at opposing ends of the body 205. Each of the second openings 225A and 225B are coupled to a transversely oriented channel 280 which is coupled to a radially oriented channel 285. Thus, in the second zone 275A, pressurized fluids from the second fluid supply 235 flows through the transversely oriented channel 280 and the radially oriented channel 285 to the inner surface 260 of the cover 210. Similarly, but independently, pressurized fluids from the third fluid supply 240 flows through the transversely oriented channel 280 and the radially oriented channel 285 to the inner surface 260 of the cover 210 in the third zone 275B. The cover 210 and the seals 265 are more clearly seen in FIG. 2C. Although only two seals 265 are shown, any number of seals may be utilized to provide any number of fluidly isolated zones of the multi-zone air turn 200.

Therefore, pressurized fluids are independently provided to each of the first zone 270, the second zone 275A, and the third zone 275B of the multi-zone air turn 200. Thus, pressure at the first zone 270, the second zone 275A, and the third zone 275B may be independently controlled. This multi-zone control enabled by the multi-zone air turn 200 as described herein provides many benefits over conventional single-zone air turns if utilized in a web transfer system such as the deposition module 100 described in FIG. 1.

Conventional air turns, if applied to a system for transporting a web, do not have a mechanism to correct web deflection and/or bowing of the web (e.g., the flexible substrate 114). For example, the electro-active material 116 and the flexible substrate 114 have dissimilar coefficients of thermal expansion which may lead to axial expansion (e.g., in the transverse or cross-web direction) of the flexible substrate 114. This may lead to wrinkling of the flexible substrate 114 and/or non-uniform deposition of electro-active material 116 thereon, particularly in the transverse direction. However, the multi-zone air turn 200 as described herein enables flattening of the flexible substrate 114 in the transverse direction while simultaneously providing contact-free support of the flexible substrate 114. The flattening of the flexible substrate 114 is provided by controlling fluid pressure in the first zone 270 relative to fluid pressure in one or both of the second zone 275A and the third zone 275B. This provides uniform coating thickness of the electro-active material 116 on the flexible substrate 114 in the transverse direction. Additionally, as layers formed from the electro-active material 116 are provided on both sides of the flexible substrate 114 (e.g., a second coating), the multi-zone air turn 200 may be utilized to control web deflection due to the dissimilar expansion as described above that results from the second coating applied on the flexible substrate 114, while preventing damage to the previously provided coating that is facing the multi-zone air turn 200. For example, the multi-zone air turn 200 as described herein allows for compensation of web deflection regardless of temperature. Further, as conventional air turns are constructed such that pressurized fluids applied thereto escapes out of the sides of the air turn, a flexible substrate may tend to bow (e.g., center high/edges low) when turning about the air turn. However, the multi-zone air turn 200 as described herein can provide more fluid to the second zone 275A and the third zone 275B to compensate for fluid loss while keeping the flexible substrate 114 flat in the transverse direction.

Returning again to FIG. 1, in some embodiments, one or more of the air turns 102, 104, 106, 108 and 110 may be heated, such as by flowing a heated fluid to the air turns 102, 104, 106, 108 and 110, which escapes and heats the flexible substrate 114. For example, the fluid supplies 230, 235 and 240 coupled to one or more of the air turns 102, 104, 106, 108 and 110 may provide pressurized fluids to each of the air turns 102, 104, 106, 108 and 110 at different temperatures. Thus, in certain embodiments, the flexible substrate 114 may be transferred over the first air turn 102 heated to a first temperature while simultaneously depositing the electro-active material 116 over the flexible substrate 114 using the dispenser assembly 112, transferring the flexible substrate 114 over a second air turn 104 heated to a second heated temperature, and transferring the flexible substrate 114 over the third air turn 106 heated to a third temperature. Although only one dispenser assembly 112 and three heated air turns 102, 104 and 106 are depicted, it should be understood that any number of dispensers and heated air turns may be used to achieve the desired deposition of electro-active material.

Additionally, each of the air turns 102, 104, 106, 108 and 110 may be differentially heated by providing a pressurized fluid from each of the fluid supplies 230, 235 and 240 at different temperatures. For example, the first fluid supply 230 may provide a pressurized fluid to the first zone 270 at a first temperature, the second fluid supply 235 may provide a pressurized fluid to the second zone 275A at a second temperature, and the third fluid supply 240 may provide a pressurized fluid to the third zone 275B at a third temperature. The first temperature may be less than or greater than the second and/or the third temperature. The second temperature and the third temperature may be the same. Alternatively or additionally, the second temperature and/or the third temperature may be greater than or less than the first temperature. Further, the second temperature and the third temperature may be different.

The module 100 is coupled with a fluid supply 125 for supplying precursors, processing gases, processing materials such as cathodically active particles, anodically active particles, binders, solvents, propellants, and cleaning fluids to the dispenser assembly 112. The deposition module 100 is coupled to a fluid source 130 which includes the fluid supplies 230, 235 and 240 that are coupled to the zones 270, 275A and 275B of each of the air turns 102, 104, 106, 108 and 110. The deposition module 100 is coupled to a controller 140. The controller 140 may include one or more microprocessors, microcomputers, microcontrollers, dedicated hardware or logic, and a combination of the same.

The heated air turns 102, 104, 106, 108 and 110 may be heated to any temperature that will dry the materials deposited onto the flexible substrate 114. For example, the heated air turns 102, 104, 106, 108 and 110 may be each individually heated to a temperature that dissolves solvents present in the electro-active material mixture deposited from the dispenser assembly 112. The temperature of the heated air turns 102, 104, 106, 108 and 110 may be each individually selected such that any liquids (e.g., solvents) present in the electro-active material mixture evaporate prior to contacting the flexible substrate 114 or evaporate while in contact with the heated flexible substrate 114.

In certain embodiments, the heating element 118 may provide optical energy to the flexible substrate 114. The optical energy from the heating element 118 may provide thermal energy to the flexible substrate 114 and control the flexible substrate 114 at a temperature between about 10 degrees Celsius and about 250 degrees Celsius. During a deposition process, the flexible substrate 114 may travel at a rate between about 1 meter/minute and about 30 meters/minute. In certain embodiments, during the deposition process the flexible substrate 114 may travel at a rate between about 10 meters/minute and about 20 meters/minute.

While the foregoing is directed to embodiments of the present disclosure, other and further embodiments of the disclosure may be devised without departing from the basic scope thereof, and the scope thereof is determined by the claims that follow.

The invention claimed is:

1. An air turn, comprising:
a body;
a porous cover disposed about a circumference of the body; and
two seals, each of the two seals positioned about the circumference of the body and spaced apart from each other in a longitudinal direction of the body to define a central zone bounded by a second zone and by a third zone, wherein:
each of the second zone and the third zone is positioned outside of a respective seal;
the body includes a first opening formed along a longitudinal axis of the body, the first opening comprises a transverse channel that is coupled to a central radial channel that extends from the transverse channel to an outer surface of the body; and
the body includes a plurality of second openings formed at a position other than along the longitudinal axis.

2. The air turn of claim 1, wherein the body comprises a rod extending from an end of the body in the longitudinal axis.

3. The air turn of claim 2, wherein the first opening is formed in the rod.

4. The air turn of claim 1, wherein the central radial channel terminates at the outer surface of the body in the central zone.

5. The air turn of claim 1, wherein each of the plurality of second openings comprises a transversely oriented channel that is parallel to the longitudinal axis.

6. The air turn of claim 5, wherein each of the transversely oriented channels is coupled to a respective radially oriented channel that extends from the transversely oriented channel to an outer surface of the body.

7. The air turn of claim 6, wherein a first radially oriented channel of the radially oriented channels terminates at the outer surface of the body in the second zone.

8. The air turn of claim 7, wherein a second radially oriented channel of the radially oriented channels terminates at the outer surface of the body in the third zone.

9. An air turn, comprising:
a body having a rod extending from an end of the body along a longitudinal axis thereof;
a porous cover disposed about a circumference of the body; and
two seals, each of the two seals positioned about the circumference of the body and spaced apart from each other in a longitudinal direction of the body to define a central zone bounded by a plurality of outer zones positioned outside of the each seal, wherein the body includes:
a first opening formed along the longitudinal axis of the body, the first opening comprises a transverse channel that is coupled to a central radial channel that extends from the transverse channel to an outer surface of the body; and
a plurality of second openings formed in the body at a position other than along the longitudinal axis.

10. The air turn of claim 9, wherein the first opening is formed in the rod.

11. The air turn of claim 9, wherein the central radial channel terminates at the outer surface of the body in the central zone.

12. The air turn of claim 9, wherein each of the plurality of second openings comprises a transversely oriented channel that is parallel to the longitudinal axis.

13. The air turn of claim 12, wherein each of the transversely oriented channels is coupled to a respective radially oriented channel that extends from the transversely oriented channel to an outer surface of the body.

14. An air turn, comprising:
a body;
a porous cover disposed about a circumference of the body; and
two seals, each of the two seals positioned about the circumference of the body and spaced apart from each other in a longitudinal direction of the body to define a central zone bounded by a second zone and by a third zone, wherein:
each of the second zone and the third zone is positioned outside of a respective seal;
the body includes a first opening formed along a longitudinal axis of the body;
the body includes a plurality of second openings formed at a position other than along the longitudinal axis; and
each of the plurality of second openings comprises a transversely oriented channel that is parallel to the longitudinal axis.

15. The air turn of claim 14, wherein each of the transversely oriented channels is coupled to a respective radially oriented channel that extends from the transversely oriented channel to an outer surface of the body.

16. The air turn of claim 15, wherein a first radially oriented channel of the radially oriented channels terminates at the outer surface of the body in the second zone.

17. The air turn of claim 16, wherein a second radially oriented channel of the radially oriented channels terminates at the outer surface of the body in the third zone.

18. The air turn of claim 14, wherein the body comprises a rod extending from an end of the body in the longitudinal axis, and wherein the first opening is formed in the rod.

19. An air turn, comprising:
a body having a rod extending from an end of the body along a longitudinal axis thereof;
a porous cover disposed about a circumference of the body; and
two seals, each of the two seals positioned about the circumference of the body and spaced apart from each other in a longitudinal direction of the body to define a central zone bounded by a plurality of outer zones positioned outside of the each seal, wherein the body includes:
a first opening formed along the longitudinal axis of the body; and
a plurality of second openings formed in the body at a position other than along the longitudinal axis, wherein each of the plurality of second openings comprises a transversely oriented channel that is parallel to the longitudinal axis.

20. The air turn of claim 19, wherein each of the transversely oriented channels is coupled to a respective radially oriented channel that extends from the transversely oriented channel to an outer surface of the body.

* * * * *